United States Patent [19]
Williamson

[11] 4,232,912
[45] Nov. 11, 1980

[54] EARTH BORING BIT WITH GRIDDED FERROUS BEARING SURFACE

[75] Inventor: Robert L. Williamson, Fort Worth, Tex.

[73] Assignee: Dresser Industries, Inc., Dallas, Tex.

[21] Appl. No.: 968,647

[22] Filed: Dec. 11, 1978

[51] Int. Cl.³ ............................................. F16C 33/24
[52] U.S. Cl. ...................................... 308/8.2; 308/239; 308/241; 308/DIG. 8
[58] Field of Search .................. 308/8.2, DIG. 8, 241, 308/239, 240; 175/371; 29/149.5 C, 149.5 R

[56] References Cited

U.S. PATENT DOCUMENTS 3,235,316  2/1966  Whanger .............................. 308/8.2

OTHER PUBLICATIONS

Sleeve Bearings Materials, Metals Handbook, 8th Ed., A.S.M., pp. 77–78 Copyright 1949.

*Primary Examiner*—Lenard A. Footland
*Attorney, Agent, or Firm*—Fred A. Winans; Eddie E. Scott

[57] ABSTRACT

A rolling cone cutter earth boring bit is provided with a bearing surface having a substantial amount of anti-galling material throughout the load area of the bearing. A rough machined bearing surface is provided with either a male or female gridded surface through the use of a fine-toothed knurling tool. Anti-galling material is applied to the gridded surface. The bearing is heat treated by conventional quench and temper procedures to provide strength to the ferrous alloy; however, special heat treating and/or carburizing is not required. Excess anti-galling material is removed by machining and/or grinding the bearing surface until a network or grid of the ferrous material is clearly discernible. The bearing provides adequate support for applied loads and substantial amounts of anti-galling material for boundary layer lubrication situations in close proximity to the load bearing area.

4 Claims, 5 Drawing Figures

EARTH BORING BIT WITH GRIDDED FERROUS BEARING SURFACE

BACKGROUND OF THE INVENTION

The present invention relates in general to the art of earth boring and more particularly to an improved bearing for a rotary rock bit. The present invention is especially adapted for use on that type of rotary rock bit popularly known as a three cone bit; however, its use is not restricted thereto and the bearing system of the present invention can be used in other earth boring equipment wherein an improved bearing is needed.

A three cone rotary rock bit is adapted to be connected as the lower member of a rotary drill string. As the drill string is rotated the bit disintegrates the formations to form an earth borehole. The three cone rotary rock bit includes three individual arms that extend angularly downward from the main body of the bit. The lower end of each arm is shaped to form a bearing pin or journal. A cone is mounted upon each bearing pin (or journal) and adapted to rotate thereon. The cones include cutting structure on their outer surface that serves to disintegrate the formations as the bit is rotated.

A rotary rock bit must operate under very severe environmental conditions and the size and geometry of the bit is restricted by the operating characteristics. At the same time, the economics of petroleum production demand a longer lifetime and improved performance from the bit. In attempting to provide an improved bit, new and improved materials have been developed for the cutting structure of the cones thereby providing a longer useful lifetime for the cones. This has resulted in the bearing and/or sealing systems being generally the first to fail during the drilling operation. Consequently, a need exists for an improved bearing system to extend the useful lifetime of the bit.

Friction and anti-friction bearings, as well as a combination of friction and anti-friction bearings, have been used in rotary rock bits. The anti-friction bearings employed have been typically a set of rollers and a set of balls positioned in mating raceways in the cone and bearing pin. Certain disadvantages are associated with anti-friction bearings. For example, the space required to accommodate the rollers and balls is obtained only by sacrificing bearing pin metal, cone shell thickness, or a combination of both. Certain disadvantages are also associated with friction bearings used in rotary rock bits. It is generally necessary to have a friction bearing length to diameter ratio of greater than two and one-half when operating under severe conditions. The size limitations of a rotary rock bit make it substantially impossible to provide this desired ratio and friction bearings used in rock bits encounter severe operating conditions.

Friction bearings in prior art rock bits have used either carburized surfaces or carburized surfaces interspersed with anti-galling material placed in grooves or slots at uniform or random intervals. Bare carburized bearing surfaces are totally dependent on lubricant performance. Carburized bearing surfaces interspersed with metallic anti-galling material at best provide the load area of the bearing with intermittent access to the anti-galling material, or only provide a small portion of the bearing load area with anti-galling material at any one instant.

DESCRIPTION PRIOR ART EARTH BORING BIT PATENTS

In U.S. Pat. No. 3,235,316 to J. R. Whanger, patented Feb. 15, 1966, a journal bearing for a rock bit is shown with alternating surface areas of wear-resistant and anti-galling materials. The bearing system disclosed in this patent includes grooves in one of the rotatable members and a soft metal having anti-galling characteristics positioned in the grooves.

In U.S. Pat. No. 3,845,994 to Roger Trey, patented Nov. 5, 1974, a plain bearing with high load capacity, particularly for boring tools with cutting wheels is shown. A plain bearing with high load capacity for boring tools with cutting wheels has a spindle attached to the body and a rotary cutting wheel mounted on the spindle. A lubricant reservoir supplies lubricant to the bearing surfaces between the spindle and the cutting wheel. The grease contains fine particles of at least one frictional material which is relatively soft compared to the hard materials of the bearing surfaces. The bearing surface of the cutting wheel has grooves around its surface with the rear sides of the grooves in the direction of rotation being substantially perpendicular to the bearing surfaces.

In U.S. Pat. No. 3,784,264 to G. C. Jackson, Jr., patented Jan. 8, 1974, an earth boring bit bearing system having a pitted bearing surface is shown. The bearing surface of one relatively rotatable member of a friction bearing is grit blasted to give it a roughened surface. A reservoir containing lubricant having entrained particles of anti-galling material is connected to the friction bearing and serves as a source of anti-galling material. Particles of the anti-galling material are picked up by the roughened surface and a film of anti-galling material formed on the bearing surface.

In U.S. Pat. No. 3,823,030 to Lester S. Hudson, patented July 9, 1974, a bearing system having entrained wear-resistant particles is shown. A rock bit bearing system is provided by filling a groove in the bearing pin of the bit with a deposit including a multiplicity of tungsten carbide particles in a high temperature resistant metal matrix. The tungsten carbide particles are introduced into the deposit using a welding rod that combines the tungsten carbide particles with hard metal welding rod materials.

In U.S. Pat. No. 3,885,838 to John S. Childers and Clayton C. Mandrell, patented May 27, 1975, a drill bit bearing is shown. A roller drill bit of the type in which a rotatable cutter is supported against radial and thrust loading on a shaft in which thrust and other frictionally engaging bearing surfaces between the cutter and the shaft are established by uncarburized surface portions in either the cutter of the shaft which are otherwise formed of carburized or case hardened steel thereby avoiding heat cracks and spalling of the steel between the bearing surfaces.

In U.S. Pat. No. 3,839,774 to G. C. Jackson, Jr., patented Oct. 8, 1974, a method of making an earth boring bearing system having a pitted bearing surface is shown. The bearing surface of one relatively rotatable member of a friction bearing is grit blasted to give it a roughened surface. A reservoir containing lubricant having entrained particles of anti-galling material is connected to the friction bearing and serves as a source of anti-galling material. Particles of the anti-galling material are picked up by the roughened surface and a film of anti-galling material formed on the bearing surface.

In U.S. Pat. No. 3,915,514 to Lester S. Hudson, patented Oct. 28, 1975, a method of making a bearing system having entrained wear-resistant particles is shown. A rock bit bearing system is provided by filling a groove in the bearing pin of the bit with a deposit including a multiplicity of tungsten carbide particles in a high temperature resistant metal matrix. The tungsten carbide particles are introduced into the deposit using a welding rod that combines the tungsten carbide particles with hard metal welding rod materials.

In U.S. Pat. No. 3,984,158 to Robert Keith Sorensen and Anthony T. Rallis, journal and pilot bearings with alternating surface areas of wear resistant and anti-galling materials are shown. The journal and/or pilot bearings of a rotary cone earth boring bit are constructed to include alternating areas of wear resistant materials and anti-galling materials. The bearing matrix is formed by compressing a powdered alloy in the shape of the desired bearing element. The bearing matrix is sintered, thereby forming a porous element. An anti-galling material is infiltrated into the porous matrix of the bearing element and the bearing element is hardened. The resulting bearing element includes areas of wear resistant materials and areas of anti-galling materials.

SUMMARY OF THE INVENTION

The present invention provides a rolling cone cutter earth boring bit with a bearing surface having a substantial amount of anti-galling material throughout the load area of the bearing. A rough machined bearing surface is provided with either a male or female gridded surface. Anti-galling material is applied to the gridded surface. The bearing is heat treated by conventional quench and temper procedures to provide strength to the ferrous allow; however, special heat treating and/or carburizing is not required. Excess anti-galling material is removed until a network or grid of the ferrous material is clearly discernible. The gridded bearing provides a substantial amount of anti-galling material to the entire load area of the bearing at all times and eliminates the need for a high hardness surface to prevent abnormal wear. The bearing provides adequate support for applied loads and substantial amounts of anti-galling material for boundary layer lubrication situations in close proximity to the load bearing area. The above and other objects and advantages of the present invention will become apparent from a consideration of the following detailed description of the invention when taken in conjunction with the drawings.

DETAILED DESCRIPTION OF THE INVENTION

Figures 1, 2, 3, 4, 5:
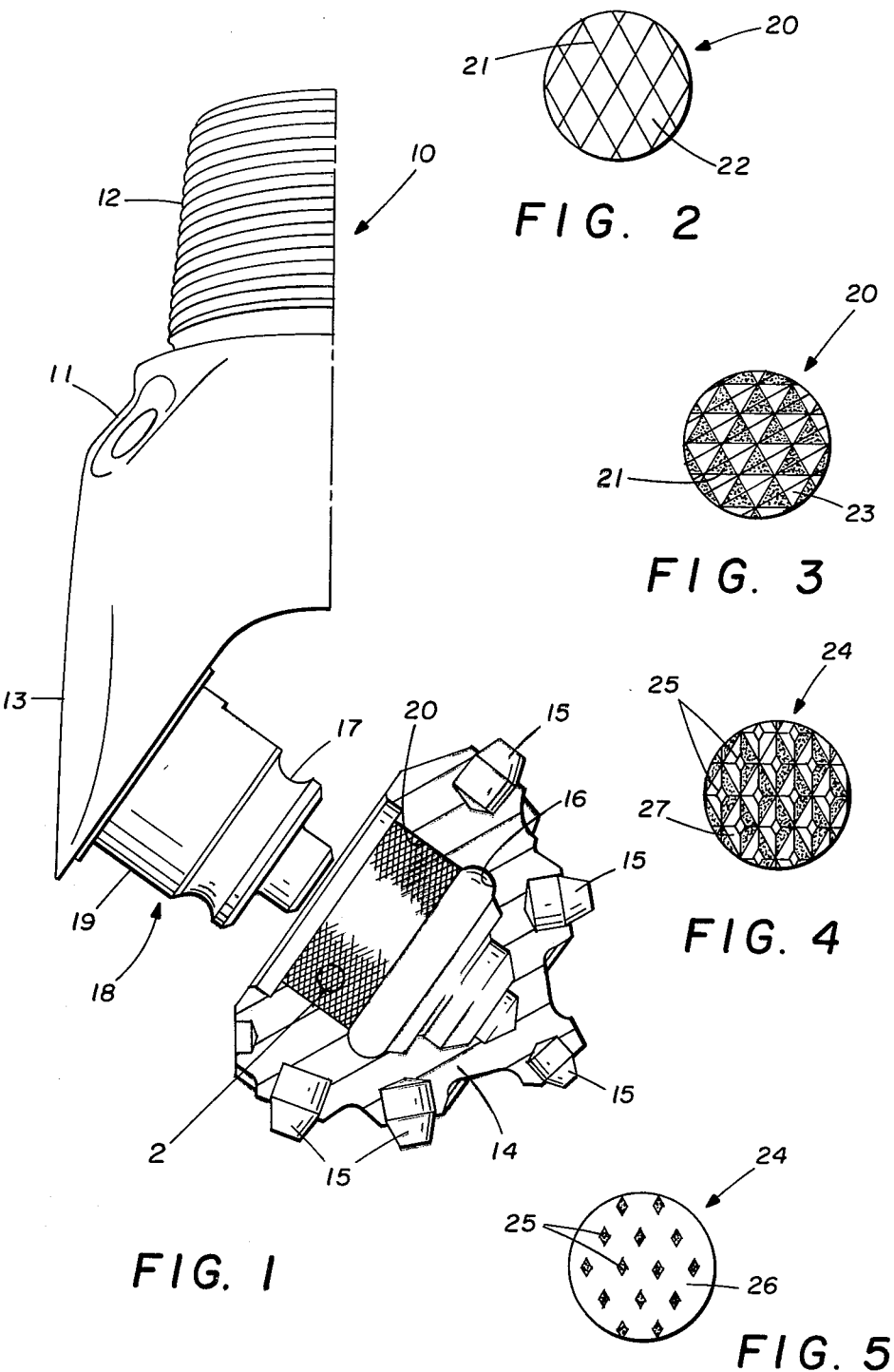
FIG. 1 illustrates a rotary rock bit constructed in accordance with the present invention.
FIG. 2 is an enlarged view of the bearing surface of the bit shown in FIG. 1.
FIG. 3 illustrates the preparation of the bearing surface shown in FIG. 2.
FIG. 4 illustrates the preparation of a bearing surface of another embodiment of the present invention.
FIG. 5 shows another embodiment of a bearing surface of the present invention.

Referring now to the drawings and to FIG. 1 in particular, a three cone rotary rock bit is illustrated. The bit 10 includes a bit body 11, including an upper threaded portion 12. The threaded portion 12 allows the bit 10 to be connected to the lower end of a rotary drill string (not shown). Depending from the bit body 11 are three substantially identical arms with arms 13 being shown in FIG. 1. The lower end of each of the arms is provided with an extended journal portion 18. Three rotary cone cutters are rotatably positioned on the three bearing pins extending from the arms. Cutter 14 is shown in FIG. 1. Each of the cutters includes cutting structure on its outer surface adapted to disintegrate formations as the bit 10 is rotated and moved downward. The cutting structure 15 extending from cutter 14 is shown in the form of tungsten carbide inserts. However, it is to be understood that other cutting structures such as steel teeth may be used as a cutting structure on the cone cutters.

The elongated lower portion of arm 13 forms the journal 18. The rotatable cutter 14 is mounted upon journal 18. A series of ball bearings (not shown) bridge between ball bearing raceways 16 and 17 to insure that rotatable cutter 14 is rotatably locked on journal 18. The rotatable cutter 14 is positioned upon journal 18 and the series of ball bearings are inserted through a bore extending into the arm 13. After the ball bearings are in place, a plug is inserted in the bore and welded therein to close the bore.

The bearing system between journal 18 and cutter 14 must insure free rotation of cones 14 under the severe drilling environmental conditions. A substantial portion of the bearing function is performed by the outer bearing formed by mating bearing surface 19 on the bearing pin 18 and surface 20 on the inside of the cutter 14.

Referring now to FIG. 2, an enlarged view of the bearing surface 20 is shown. A grid 21 of ferrous alloy provides support for applied loads and a substantial amount of anti-galling material 22 within the grid 21 provides anti-galling material for boundary layer lubrication situations.

Referring now to FIG. 3, the preparation of the bearing surface will be considered. A rough machined bearing surface is provided through the use of a fine-toothed knurling tool. A female gridded surface is shown in FIG. 3 with ridges or knurls 21 of the ferrous alloy material. Inside the ridges 21 are indentations or valleys 23 formed by the knurling tool removing material from the cutter 14. Anti-galling material is applied to the gridded surface. The anti-galling material fills the valleys 23. The anti-galling material may be material such as silver, lead or plastic materials or other anti-galling material.

The bearing surface 20 is heat treated by a conventional quench and temper procedure to provide strength to the ferrous alloy 21. It is not necessary to carburize the bearing surface 20 or subject it to special heat treat procedures. Anti-galling materials are applied to the ferrous alloy 21 after the quench and temper operation. The excess anti-galling material is removed by machining and/or grinding the bearing surface until a network or grid 21 of the ferrous material is clearly discernible. The bearing provides adequate support for applied loads and substantial amounts of anti-galling material 22 for boundary layer lubrication situations in close proximity to the load bearing area. The gridded bearing provides a substantial amount of anti-galling material to the entire load area of the bearing at all times and eliminates the need for a high hardness (carburized or equivalent hardness) surface to prevent abnormal wear.

Referring now to FIG. 4, the preparation of a bearing surface 24 in accordance with another embodiment of the present invention is illustrated. A rough machine bearing surface is provided through the use of a fine-tooth knurling tool. A male gridded surface is shown in FIG. 4 with peaks or knurls 25 extending from the body of the cutter. Between the peaks 25 and valleys 27 formed by the knurling tool removing material from the cutter 14. The valleys 24 will be filled with anti-galling material 26 as shown in FIG. 5. The anti-galling material 26 may be material such as silver, lead or plastic materials or other anti-galling material. The bearing surface 24 is heat treated by a conventional quench and temper to provide the required strength to the ferrous alloy 25. Certain anti-galling materials may be applied to specific ferrous alloys after the quench and temper operation. However, in no case is any special heat treatment or carburizing prescribed for the ferrous alloy for its strengthening. The excess anti-galling material is removed by machining and/or grinding the bearing surface 24 until a network of the ferrous material 25 is cleary discernible. The bearing surface 24 can be used in boundary layer lubrication situations and will enhance bearing life and lessen wear. A more enduring and less costly bearing surface is provided through the economic use of anti-galling material and the elimination of lengthy heat treating and/or carburizing procedures. The bearing surface 24 provides adequate support for applied loads and substantial amounts of anti-galling material 26 for boundary layer lubrication situations in close proximity to the load bearing area.

The embodiments of an invention in which an exclusive property or privilege is claimed are defined as follows:

1. A rolling cone cutter earth boring bit, comprising:
   a bit body, said bit body having at least one downwardly extending arm;
   a cantilevered bearing pin of ferrous alloy extending from said arm;
   a rolling cone cutter of ferrous alloy adapted to be rotatably mounted on said bearing pin;
   bearing and cutter retaining means between said bearing pin and said cone cutter;
   a quenched and tempered ferrous alloy bearing surface between said rolling cone cutter and said bearing pin;
   a quantity of knurls and indentations on said bearing surface; and
   a layer of anti-galling material overlying said bearing surface.

2. The rolling cone cutter earth boring bit of claim 1 wherein said bearing surface is uncarburized.

3. A rolling cone cutter earth boring bit, comprising:
   a bit body, said bit body having at least one downwardly extending arm;
   a ferrous alloy cantilevered bearing pin extending from said arm;
   a ferrous alloy rolling cone cutter adapted to be rotatably mounted on said bearing pin;
   bearing and cutter retaining means between said bearing pin and said cone cutter;
   a quenched and tempered ferrous alloy bearing surface in said rolling cone cutter;
   a quantity of knurls and indentations on said bearing surface; and
   a layer of anti-galling material overlying said bearing surface.

4. The rolling cone cutter earth boring bit of claim 3 wherein said bearing surface is uncarburized.

* * * * *